3,373,466
PACKER HEAD ROLLER FOR CEMENT
PIPE FORMING
Donald C. Pausch, Indio, Calif., assignor to Pausch & Sons Equipment, Inc., Mecca, Calif., a corporation of California
Filed Jan. 24, 1966, Ser. No. 522,652
6 Claims. (Cl. 25—36)

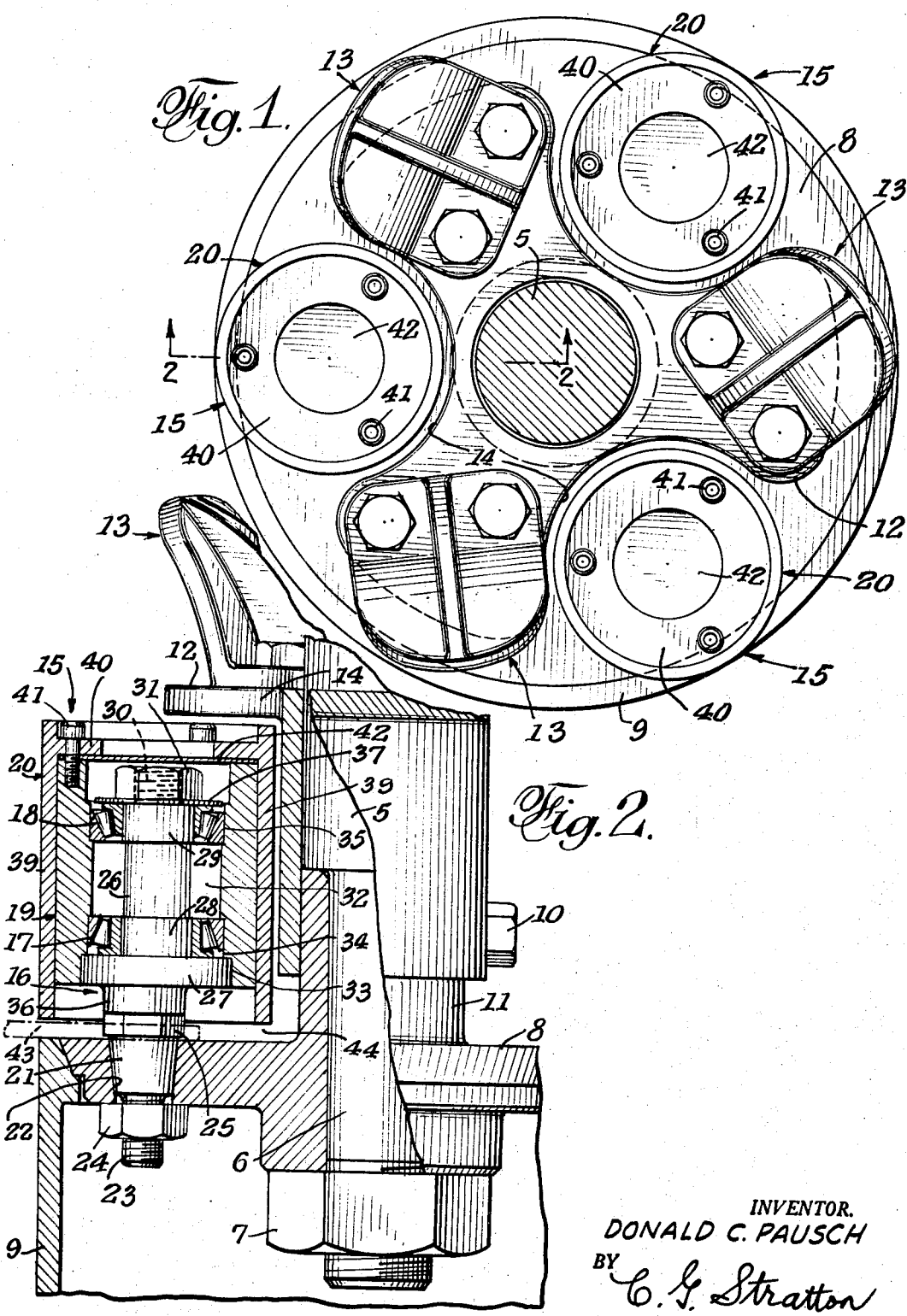
March 19, 1968     D. C. PAUSCH     3,373,466
PACKER HEAD ROLLER FOR CEMENT PIPE FORMING
Filed Jan. 24, 1966
INVENTOR.
DONALD C. PAUSCH
BY C. G. Stratton
ATTORNEY United States Patent Office 3,373,466
Patented Mar. 19, 1968

This invention relates to a roller for packer heads used for forming pipes of cement, concrete or other aggregates. The present invention is particularly directed to the roller, of which two to four are mounted on the traveling cylinder of a rotary packer head, to pack aggregate material in a vertical outer cylindrical form for subsequent troweling or smoothening by the cylinder of the inner surface of the pipe that is formed of said packed aggregate. The packer head is moved upward as aggregate is fed from above, causing the pipe to be formed in the form from the bottom up.

An object of the present invention is to provide a roller for packer heads that is freely rotational under lateral loads as generated when packing aggregate.

Another object of the invention is to provide a roller, as characterized, that is provided with an eccentric mounting stud which is tightly seated when locked, the roller being adjustable around the axis of said stud with no disassembly except loosening of the lock means.

A further object of the invention is to provide a packer roller that is formed to minimize aggregate being introduced into the area of anti-friction bearings mounting the roller on the eccentric part of the mounting stud.

A still further object of the invention is to provide simple slip-on connecting means between the outer bearing race of the roller and a replaceable wear sleeve on the roller.

This invention also has for its objects to provide such means that are positive in operation, convenient in use, easily installed in a working position and easily disconnected therefrom, economical of manufacture, relatively simple, and of general superiority and serviceability.

The above objects are realized in a roller construction that has a mounting stud with a tapered end that is locked to the head plate of a troweling cylinder by a nut engaged with a threaded extension of said tapered end, a wrench-engageable polygonal portion on the stud located immediately adjacent the top surface of the head plate for rotationally adjusting the stud when the mentioned nut is loosened, an eccentric upper extension on the stud for mounting the inner races of vertically spaced taper roller bearings, the outer races of said bearings being fitted in a ring hub which, at its lower end, is provided with an annular seat for a flange on the stud which protects the bearings from aggregate particles from beneath, a single nut engaged with the upper end of the eccentric extension of the stud to lock the roller bearings in position, and a hardened wear sleeve removably mounted on said ring hub and having a lower rim or edge that is spaced from said head plate only sufficient to allow insertion of a flat wrench to engage the polygonal part of the stud, an upper flange on said wear sleeve holding a closure plate in sealing arrangement with the upper end of the stud and bearings.

The invention also comprises novel details of construction and novel combinations and arrangements of parts, which will more fully appear in the course of the following description and which is based on the accompanying drawing. However, said drawing merely shows, and the following description merely describes, one embodiment of the present invention, which is given by way of illustration or example only.

In the drawing, like reference characters designate similar parts in the several views.

FIG. 1 is a plan view, with the mounting and operating shaft thereof in cross-section, of a packer head provided with packer rollers according to the present invention.

FIG. 2 is a fragmentary vertical sectional view as taken on the line 2—2 of FIG. 1.

The packer head that is illustrated comprises a rotational shaft 5 that is movable vertically upward during formation within the outer liner of a form of a cement, concrete or other aggregate pipe. A lower reduced extension 6 of said pipe is secured, as by a nut 7, to a head plate 8 which carries a troweling cylinder 9, the outer surface of which is concentric with said shaft. By means of a set screw 10, a vertically extending hub 11 of the head plate 8 adjustably mounts a cement spreader plate 12 upon which a set of symmetrically spaced feeder members 13 is carried, the latter being angularly disposed and outwardly curved to form cement slingers that direct such material, when fed from above, downwardly upon the spreader plate. In this case, the members 13 are disposed to sling material with the packer having a clockwise rotation as viewed from above, as in FIG. 1.

The spreader plate 12, between the slinger members 13, is formed to have arcuate recesses 14 to clear the packer rollers 15 of the present invention. In this case, three rollers 15 are shown, the plate 12 and members being designed to conform to such number.

It will be understood that said rollers, being exposed at the top, are in the path of material fed from above. Also, the top face of the head plate 8, on which said rollers are mounted, are, also, in the path of such material which is not intercepted by the spreader plate 12 and diverted by the slinger members 13. As a consequence, such material, if allowed to accumulate around the rollers, may impair their packing efficiency, particularly the free rotation thereof. The greater the resistance to roller rotation, the greater and more uneven is the wear on their packing faces. The present roller structure seeks to obviate the above faults by keeping the same freely rotational, resistant to wear and/or providing for ready replacing worn parts, and adjustable for desired packing position of the rollers on their eccentrically arranged tapered roller bearings.

Each roller 15 comprises a mounting stud 16, two vertically spaced tapered roller bearings 17 and 18 fitted on said stud, a ring hub 19 mounted to turn on said bearings, and a hardened wear sleeve 20 separably secured to said hub.

The stud 16 has a tapered lower end 21 for seating engagement in a tapered seat 22 in the head plate 8. A lower threaded extension 23 on the end 21 is engageable by a lock nut 24 for drawing said tapered end 21 tightly into the seat 22, thereby holding or locking the stud firmly non-rotational until said nut is slacked off. A polygonal part 25 is provided on the stud above the tapered end 21, the same, when the stud is locked in place, being disposed immediately above and adjacent the top face of the head plate 8 and the upper edge of the troweling cylinder 9.

Said stud 16 is formed to have an upwardly extending eccentric part 26 that has an annular flange 27 above the polygonal part 25, two vertically spaced bearing collars 28 and 29 above said flange, and a threaded extension 30 at the top. It will be clear that the axis of said eccentric part 26, depending on the rotative adjustment of the stud around the axis of the tapered end 21, will be differently spaced from the axis of shaft 5 and have a correspondingly different relation to the circumferential face of the troweling cylinder 9.

The inner races of the taper roller bearings 17 and 18 are affixed, as by a press fit, to the respective collars 28 and 29. The threaded extension 30 of the stud is for a nut 31 that, through a washer 37, cooperates with the flange 27 to locate said inner races on the stud.

The ring hub 19 has an axial bore 32 into which the eccentric part 26 of the stud extends, a counter bore 33 thereof housing the stud flange 27, and annular seats 34 and 35, formed in said bore having tight engagement with the outer races of the respective bearings 17 and 18. The ring hub 19 is formed to be clear of contact with the flange 27 and the washer 37, being held in vertically aligned position by the interfit of the rollers of said bearings 17 and 18, said rollers of each bearing, in the usual way, being held spaced by a cage between the bearing races. The bearings contemplated are of the type similar to or known as Timkin roller bearings. In the rollers shown, the flange 27 and the adjacent end of the ring hub are spaced from the head plate 8 not only by the polygonal part 25, but also by an intermediate part 36 on the stud to leave a clear space of substantial height between said head plate and the lower end of the ring hub.

The sleeve 20 is formed of wear-resistant metal to have a tubular part 39 that has a slide fit over the ring hub, and an upper flange 40 that is located below the upper edge of the tubular part 39 to provide a well or recess in which the heads of cap screws 41 that removably secure the sleeve to the ring hub are housed. To protect the upper bearing 18, a thin sealing plate 42 is interposed between said flange 40 and the upper edge of the ring hub. The length of the tubular part is such that its lower end extends substantially below the bottom surfaces of the flange 27 and the ring hub 19 and yet spaced sufficiently above the head plate 8 to accommodate a flat wrench 43 for engagement through said small space 44 with the polygonal part 25 of the stud. Space 44, when made as small as possible, yet accommodating a wrench 43, is small enough to intercept particles of aggregate to maintain the space below the ring hub 19 reasonably clear, thus enabling said hub and the sleeve thereon to turn freely during an aggregate-packing operation.

The integral sleeve 20 of each roller 15 can easily be removed and replaced through the recesses from above, only the screws 41 need be handled when the sleeves are to be replaced.

It will be noted that the roller bearings of each roller 15 are arranged in opposed relation with the rollers thereof tapered toward each other to locate the ring hub firmly against endwise play on the eccentric extension of the stud.

While the foregoing has illustrated and described what is now contemplated to be the best mode of carrying out the invention, the construction is, of course, subject to modification without departing from the spirit and scope of the invention. Therefore, it is not desired to restrict the invention to the particular form of construction illustrated and described, but to cover all modifications that may fall within the scope of the appended claims.

Having thus described this invention, what is claimed and desired to be secured by Letters Patent is:

1. A roller for mounting on the head plate of the troweling cylinder of a packer head, a tapered seat being provided in said plate, said roller comprising:
   (a) a stud provided with a lower tapered end fitted in said seat and having a threaded extension for a nut to lock the stud tightly to the head plate,
   (b) an upper extension on said stud on an axis eccentric to the axis of the tapered end and threaded extension,
   (c) two vertically spaced taper roller bearings having their inner races tightly fitted to the eccentric extension of the stud,
   (d) flange integral with the stud, coaxial with the eccentric extension and located above the tapered end of the stud,
   (e) a ring hub mounted on the outer races of the taper roller bearings and formed with an annular seat to accommodate the flange on the stud, and
   (f) a removable hardened wear sleeve on the ring hub and having a lower end that is spaced closer to the head plate of the troweling cylinder than are said flange and the lower end of the ring hub.

2. A packer head roller according to claim 1, in which the stud, between the tapered end thereof and the mentioned flange, is provided with a polygonal portion for engagement by a wrench interposed between the head plate and the bottom end of said sleeve for adjustably turning the stud on the axis of the tapered end.

3. A packer head roller according to claim 1 in which the mentioned sleeve is provided with an integral inwardly directed flange that rests upon the upper edge of the ring hub and is secured to said hub by cap screws extending through said flange.

4. A packer head according to claim 3 in which a sealing plate is interposed between said ring hub edge and the flange on the sleeve and covers the roller bearings from above.

5. A packer head according to claim 1 in which roller bearings are arranged in opposed relation with the rollers thereof tapered toward each other to locate the ring hub on the eccentric extension of the stud.

6. A packer head according to claim 5 in which the eccentric end of the stud is provided with an externally threaded extension, and a nut engaged with said extension to retain the upper roller bearing against longitudinal, upward displacement.

References Cited
UNITED STATES PATENTS 2,914,364　11/1959　Ross _____ 308—211 X
3,276,091　10/1966　Pausch _____ 25—36

J. SPENCER OVERHOLSER, *Primary Examiner.*

J. R. BELL, *Assistant Examiner.*